(12) United States Patent
Du et al.

(10) Patent No.: US 11,593,233 B2
(45) Date of Patent: Feb. 28, 2023

(54) METHOD, APPARATUS AND COMPUTER STORAGE MEDIUM FOR DATA SYNCHRONIZATION

(71) Applicant: EMC IP Holding Company LLC, Hopkinton, MA (US)

(72) Inventors: Fang Du, Guangyuan (CN); Pan Xiao, Chengdu (CN); Xu Chen, Chengdu (CN); Peilei Chen, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 257 days.

(21) Appl. No.: 16/576,959

(22) Filed: Sep. 20, 2019

(65) Prior Publication Data

US 2020/0133804 A1    Apr. 30, 2020

(30) Foreign Application Priority Data

Oct. 31, 2018    (CN) .......................... 201811291264.1

(51) Int. Cl.
| | |
|---|---|
| *G06F 11/16* | (2006.01) |
| *G06F 11/20* | (2006.01) |
| *G06F 9/50* | (2006.01) |
| *G06F 9/48* | (2006.01) |
| *G06F 11/14* | (2006.01) |

(52) U.S. Cl.
CPC ........ *G06F 11/1658* (2013.01); *G06F 9/4837* (2013.01); *G06F 9/505* (2013.01); *G06F 9/5038* (2013.01); *G06F 11/1461* (2013.01); *G06F 11/2082* (2013.01)

(58) Field of Classification Search
CPC ............. G06F 11/1658; G06F 11/2082; G06F 9/5038; G06F 9/505; G06F 9/4837; G06F 11/1461; G06F 2201/84; G06F 11/2097; G06F 11/2094; G06F 11/1446
See application file for complete search history.

(56) References Cited

U.S. PATENT DOCUMENTS

| | | | |
|---|---|---|---|
| 6,874,130 B1 * | 3/2005 | Baweja | ................. G06F 3/0481 715/764 |
| 8,117,235 B1 | 2/2012 | Barta | |
| 8,181,168 B1 * | 5/2012 | Lee | ........................... G06F 8/41 717/149 |
| 8,769,550 B1 * | 7/2014 | Leonard | .................. G06F 9/505 719/314 |
| 8,776,074 B1 * | 7/2014 | Heisler | .............. G06Q 10/0631 718/103 |

(Continued)

*Primary Examiner* — Adam Lee
(74) *Attorney, Agent, or Firm* — BainwoodHuang

(57) ABSTRACT

Techniques provide for data synchronization. For example, such a technique may involve: obtaining respective synchronization characteristics of a group of synchronization jobs to be processed, each synchronization characteristic indicating at least one of an expected completion time instant and an amount of data to be synchronized of a corresponding synchronization job; prioritizing the group of the synchronization jobs based on the synchronization characteristics; and controlling execution of the group of the synchronization jobs based on a result of the prioritizing. Accordingly, high priority is given to the synchronization jobs which can be rapidly completed thereby improving the Recovery Point Objective (RPO) achievement rate before occurrence of a failure.

20 Claims, 5 Drawing Sheets

(56) References Cited

U.S. PATENT DOCUMENTS

| | | | |
|---|---|---|---|
| 8,818,988 B1* | 8/2014 | Brown | G06F 16/217 707/713 |
| 9,223,529 B1* | 12/2015 | Khafizova | G06F 3/1294 |
| 9,798,584 B1 | 10/2017 | Kulkarni et al. | |
| 9,824,130 B1* | 11/2017 | Korshunov | G06F 16/27 |
| 9,830,471 B1* | 11/2017 | Rokicki | G06F 11/1458 |
| 9,996,858 B1* | 6/2018 | Flowerday | G06Q 30/0275 |
| 10,083,094 B1* | 9/2018 | Thomas | G06F 11/1451 |
| 10,095,428 B1* | 10/2018 | Meiri | G06F 3/0647 |
| 10,261,853 B1* | 4/2019 | Chen | G06F 11/0727 |
| 10,402,090 B1 | 9/2019 | Tsaur et al. | |
| 10,481,963 B1* | 11/2019 | Walker | H04L 1/0008 |
| 10,581,751 B1* | 3/2020 | Viswanathan | G06F 3/0605 |
| 10,809,922 B2 | 10/2020 | Zhang et al. | |
| 10,860,427 B1 | 12/2020 | Chakraborty et al. | |
| 2006/0037021 A1* | 2/2006 | Anand | G06F 9/4881 718/102 |
| 2006/0095696 A1* | 5/2006 | Amano | G06F 11/1471 711/162 |
| 2006/0095912 A1* | 5/2006 | Wood-Gaines | G06F 11/3495 718/100 |
| 2007/0242640 A1* | 10/2007 | Uchida | H04W 72/1236 370/335 |
| 2008/0144601 A1* | 6/2008 | Nurminen | H04L 69/14 370/350 |
| 2008/0288948 A1* | 11/2008 | Attarde | G06F 3/0683 718/103 |
| 2009/0083345 A1* | 3/2009 | Sudo | H04L 67/1097 |
| 2009/0172674 A1* | 7/2009 | Bobak | G06F 11/1482 718/101 |
| 2009/0320029 A1* | 12/2009 | Kottomtharayil | G06F 9/505 718/102 |
| 2010/0262975 A1* | 10/2010 | Reysa | G06F 9/5077 718/105 |
| 2011/0196842 A1* | 8/2011 | Timashev | G06F 11/1469 707/679 |
| 2011/0246996 A1* | 10/2011 | Tunning | G06F 9/4881 718/103 |
| 2012/0167101 A1* | 6/2012 | Kandula | G06F 9/5088 718/102 |
| 2012/0210064 A1* | 8/2012 | Coronado | G06F 11/2069 711/E12.017 |
| 2012/0250512 A1* | 10/2012 | Jagadeeswaran | H04L 47/17 370/235.1 |
| 2013/0055275 A1* | 2/2013 | Comeau | H04W 72/1257 718/103 |
| 2013/0107783 A1* | 5/2013 | Shaw | H04W 4/06 370/312 |
| 2013/0318463 A1* | 11/2013 | Clifford | G06F 11/1453 715/772 |
| 2013/0346990 A1* | 12/2013 | Lam | G06F 9/4881 718/102 |
| 2014/0165070 A1* | 6/2014 | Persikov | G06F 9/4881 718/103 |
| 2014/0297588 A1* | 10/2014 | Babashetty | G06F 11/3027 707/613 |
| 2015/0095601 A1* | 4/2015 | Muralimanhar | G06F 13/385 711/163 |
| 2015/0347189 A1* | 12/2015 | Steffen | G06F 9/4881 718/103 |
| 2016/0026535 A1* | 1/2016 | Bhat | G06F 11/2097 714/19 |
| 2016/0092267 A1* | 3/2016 | Boyacigiller | G06Q 10/0633 718/103 |
| 2016/0335166 A1* | 11/2016 | George | G06F 11/00 |
| 2017/0031776 A1* | 2/2017 | Ren | G06F 11/1451 |
| 2017/0242599 A1* | 8/2017 | Patnaik | G06F 11/1662 |
| 2017/0249222 A1* | 8/2017 | Patnaik | G06F 11/1464 |
| 2018/0024894 A1* | 1/2018 | Naik | G06F 3/0605 711/162 |
| 2018/0067813 A1* | 3/2018 | Venkatesh | G06F 11/1469 |
| 2018/0067819 A1* | 3/2018 | Kotha | G06F 11/1461 |
| 2019/0278663 A1* | 9/2019 | Mehta | G06F 3/067 |
| 2019/0386930 A1* | 12/2019 | Shrivastava | H04L 47/822 |

\* cited by examiner

METHOD, APPARATUS AND COMPUTER STORAGE MEDIUM FOR DATA SYNCHRONIZATION

CROSS-REFERENCE TO RELATED APPLICATION

This application claims priority to Chinese Patent Application No. CN201811291264.1, on file at the China National Intellectual Property Administration (CNIPA), having a filing date of Oct. 31, 2018, and having "METHOD, APPARATUS AND COMPUTER STORAGE MEDIUM FOR DATA SYNCHRONIZATION" as a title, the contents and teachings of which are herein incorporated by reference in their entirety.

FIELD

Embodiments of the present disclosure generally relate to the field of data synchronization, and more specifically, to a method, a device and a computer storage medium for improving data synchronization.

BACKGROUND

In the field of data synchronization, asynchronous replication is mainly used to replicate data over long distances. The concept of a Recovery Point Objective (RPO) is introduced in asynchronous replication. The RPO represents the maximum amount of data the user is willing to lose in the event of failure or disaster, and can be measured in time.

The RPO can determine the minimum frequency at which synchronization occurs. The frequency of asynchronous replication can be represented by RPO interval. Within a time between two adjacent synchronizations, new data is only stored on the source storage resources. Then, all changes made to the source storage resources since the last synchronization are replicated to the destination storage device according to the RPO interval of asynchronous replication.

SUMMARY

Embodiments of the present disclosure provide a method, a device and a computer storage medium for data synchronization.

In a first aspect of the present disclosure, there is provided a method for data synchronization. The method includes: obtaining respective synchronization characteristics of a group of synchronization jobs to be processed, each synchronization characteristic indicating at least one of an expected completion time instant and an amount of data to be synchronized of a corresponding synchronization job; prioritizing the group of the synchronization jobs based on the synchronization characteristics; and controlling execution of the group of the synchronization jobs based on a result of the prioritizing.

In some embodiments, obtaining the synchronization characteristics may include: obtain respective Recovery Point Objectives RPOs of the group of synchronization jobs and a current time instant of a storage system; and determining the expected completion time instant of the corresponding synchronization job based on the RPO of the corresponding synchronization job and the current time instant of the storage system.

In some embodiments, the method may further include: in response to arrival of a new synchronization job, determining the number of current active synchronization jobs; and in response to the number reaching a threshold, adding the new synchronization job into the group of synchronization jobs.

In some embodiments, the prioritizing may include: determining, based on the expected completion time instant of the corresponding synchronization job, a length of available time for executing the synchronization job before the expected completion time instant; and determining a priority for executing the corresponding synchronization job based on the length of available time. In a further embodiment, the prioritizing may further include: determining, based on both the length of available time and the amount of data to be synchronized, the priority for executing the corresponding synchronization job.

In some embodiments, determining the priority for executing the corresponding synchronization job may include: normalizing the length of available time and the amount of data to be synchronized of the corresponding synchronization job, respectively; and determining the priority of the corresponding synchronization job based on a weighted sum of the normalized length of available time and the normalized amount of data to be synchronized.

In some embodiments, controlling execution of the synchronization job may include: in response to the number of the current active synchronization jobs being below a threshold, selecting from the group of synchronization jobs a synchronization job with highest priority as a synchronization job to be executed based on the result of the prioritizing; and executing the selected synchronization job.

In a second aspect of the present disclosure, there is provided an electronic device. The electronic device includes at least one processor; and at least one memory. The memory is coupled to the at least one processor and has computer programs stored therein. The computer programs, when executed by the at least one processor, causes the electronic device to perform any of the methods according to the first aspect of the present disclosure.

In a third aspect of the present disclosure, there is provided a computer storage medium including computer programs stored thereon. The computer programs, when executed in a processor, cause the processor to perform any of the methods according to the first aspect of the present disclosure.

In a fourth aspect of the present disclosure, there is provided a computer program product. The computer program product is tangibly stored in a non-transitory computer-readable medium and includes machine-executable instructions. The machine-executable instructions, when executed, cause a machine to perform any methods according to the first aspect of the present disclosure.

Although specific embodiments are illustrated by way of example in the drawings, it should be understood that descriptions of the detailed embodiments herein are not intended to limit the embodiments to the specific forms as disclosed.

BRIEF DESCRIPTION OF THE DRAWINGS

Through the disclosure and claims below, objectives, advantages and other features of the present disclosure will become more apparent. For the purpose of examples only, non-limiting description of the preferred embodiments are provided with reference to the drawings, in which:

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Many details are described in the following description for the purpose of explanation. However, those ordinary skilled in the art will recognize that embodiments of the present disclosure may be implemented without utilizing the specific details. Therefore, the present disclosure is not intended to be limited by the illustrated embodiments. Instead, the present disclosure is given a broadest scope in consistency with principles and features described herein.

It should be understood that the terms "first," "second" and the like are only used to distinguish one element from another element. In fact, the first element could be termed as the second element, and vice versa. Moreover, it should also be understood that the terms "include" and "comprise" are only used to specify the presence of stated features, elements, functions or components, but do not preclude the presence of one or more other features, elements, functions or components.

Figure 1:
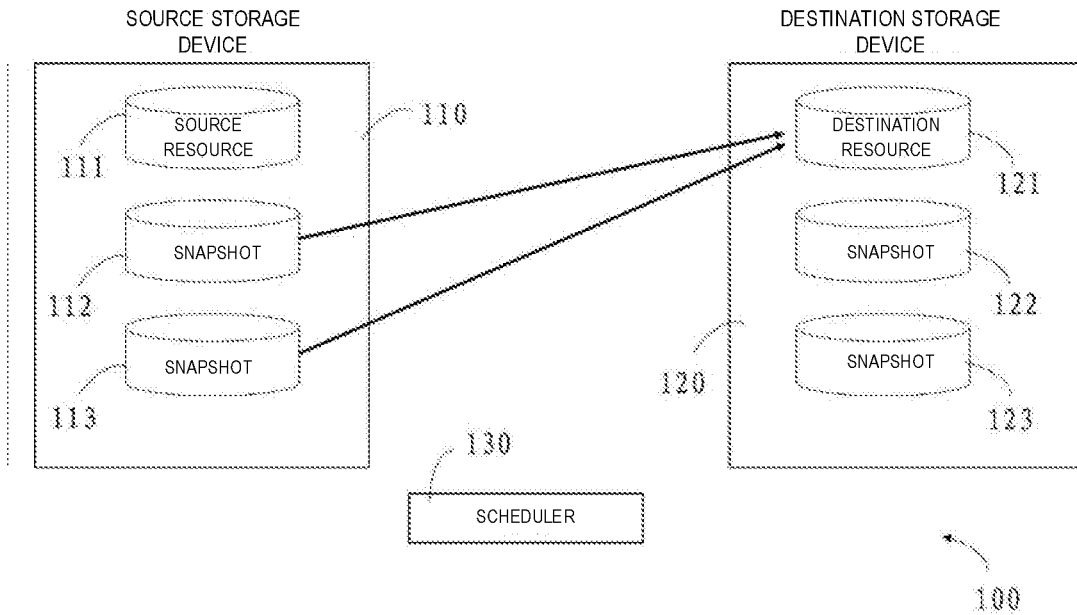
FIG. 1 illustrates an example storage system architecture which performs data synchronization with asynchronous replication according to embodiments of the present disclosure.

FIG. 1 illustrates an example storage system architecture 100 which performs data synchronization with asynchronous replication according to embodiments of the present disclosure. However, it should be noted that embodiments of the present disclosure are not limited to be implemented in the architecture as shown.

The example architecture of FIG. 1 includes a source storage device 110, a destination storage device 120 and a scheduler 130. In this example, the source storage device 110 includes source resources 111, a snapshot 112 and a snapshot 113, while the destination storage device 120 includes destination resources 121, a snapshot 122 and a snapshot 123.

In some embodiments, the snapshots as shown in FIG. 1 may be Unity snapshots. In asynchronous replication, the Unity snapshots may be used to maintain common base images. For example, under the control of the scheduler 130, the synchronization of incremental data between the source storage device 110 and the destination storage device 120 of FIG. 1 may be automatically performed with snapshots and the RPO via the following operation flow:

Step 1: creating an asynchronous replication session. As an example, the operation may include creating two snapshots (112, 113 and 122, 123) on each of the storage resources (111, 121).

Step 2: replicating data from the snapshot 112 to the destination resources 121.

Step 3: refreshing the snapshot 122 on the destination resources 121 to become a common base image.

Step 4: writing data into the destination resources 121

Step 5: during the next RPO, refreshing the snapshot 113 and replicating only changes made to the destination resources since the last synchronization to the destination resources 121.

Step 6: refreshing the snapshot 123 on the destination to become a new common base image.

In asynchronous replication (e.g., Unity snapshot-based replication implementation), the execution of synchronization jobs is limited by the maximum number of active synchronization jobs defined in the storage system. Any of the incoming synchronization jobs will be pushed into an active job list or a waiting job list, depending on whether the number of the current active jobs reaches the maximum number of the active jobs.

Figure 2:
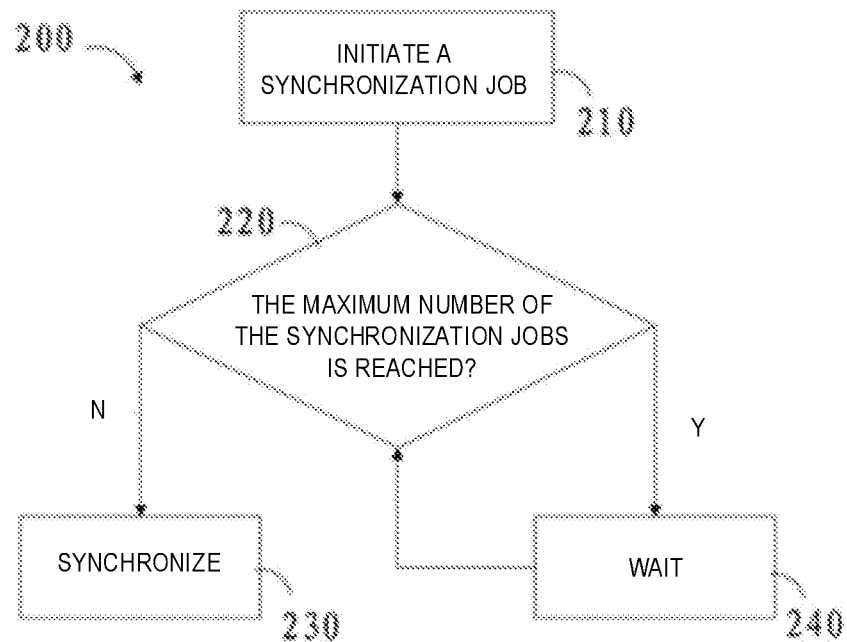
FIG. 2 illustrates an example of processing the incoming synchronization jobs.

FIG. 2 illustrates an example of processing the incoming synchronization jobs by the scheduler.

In this example, after a synchronization job is initiated at block 210, the scheduler determines, at block 220, whether the number of the active synchronization jobs reaches a predetermined maximum number. If the predetermined maximum number is not reached, the initiated synchronization job is executed at block 230; otherwise, the initiated synchronization job waits to be processed at block 240.

Inventors of the present disclosure have recognized that the asynchronous replication may not ensure that the RPO of each of the replication sessions can be achieved due to the following factors, for example the performance and network bandwidth of the source and destination storage systems, remaining data transmission time, size of incremental data for synchronization and concurrent active synchronization jobs.

From user's perspective, the loss rate of RPO should be as low as possible. However, the limitation of the conventional implementation is that the above factors that affect the achievement of RPO are not taken into consideration when trying to decrease the loss rate of RPO. Inventors of the present disclosure have recognized that it is unwise for a storage system to execute, within the same time period prior to the occurrence of failure/disaster, the synchronization jobs with a relatively large incremental data size, and queue the synchronization jobs which have less incremental data and with sufficient time for data transmission before the next RPO arrives. This is because the RPO of the synchronization jobs with relatively small incremental data size is likely to be achieved before the occurrence of failure/disaster.

Based on the above considerations, the present disclosure proposes that if a replication session (i.e., the synchronization session) has a small incremental data size and with sufficient processing time, its synchronization jobs may be prioritized.

Furthermore, if a certain replication session is set a short RPO, which means the time for its synchronization job is short, the storage system cannot always postpone such job. This also makes sense to the customers, because the higher the synchronization frequency is set, the more important the corresponding session is, and such a session needs to be synchronized with a higher priority.

Therefore, the present disclosure provides that for the storage system, when synchronization jobs are scheduled, the influence of available processing time and/or incremental data size may be considered in order to improve the RPO achievement rate.

Some embodiments of the present disclosure will be described below with reference to the accompanying drawings to provide a thorough understanding of the solution set forth in the present disclosure.

Figure 3:
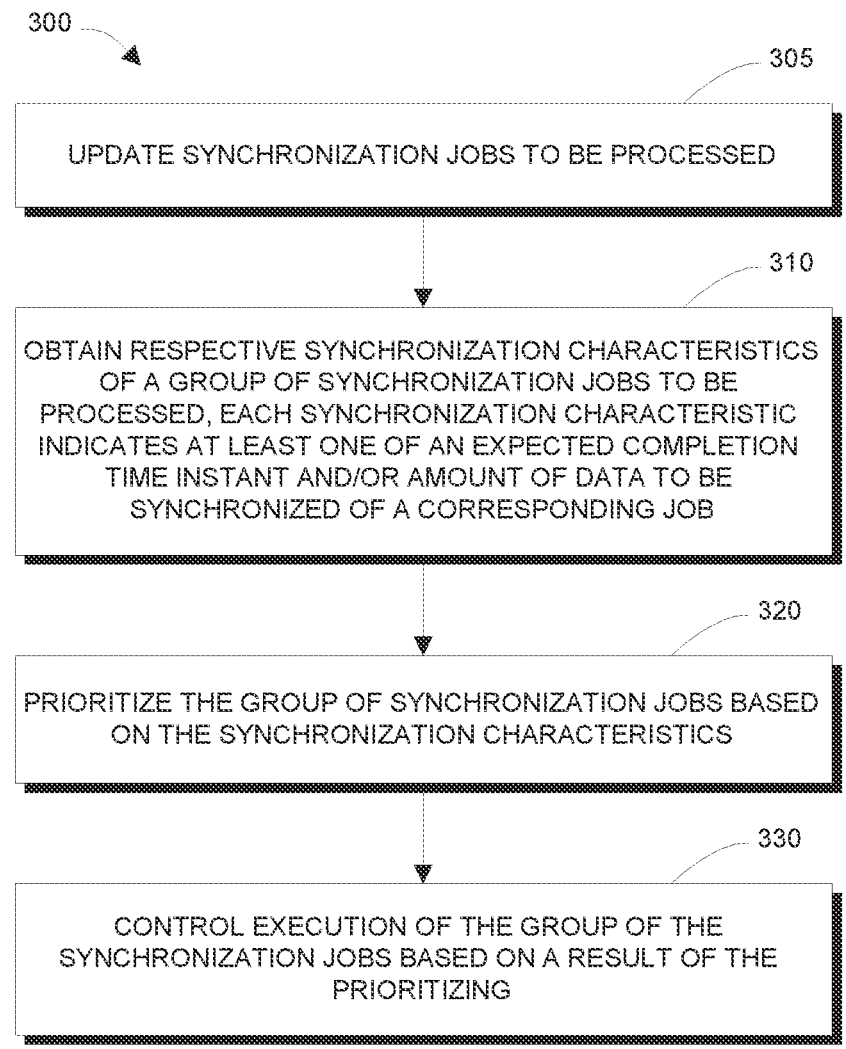
FIG. 3 illustrates a method for data synchronization according to embodiments of the present disclosure.

FIG. 3 illustrates a method 300 for data synchronization according to embodiments of the present disclosure. All or part of the method 300 may be performed, for example, by the scheduler 130 of FIG. 1. For ease of description, embodiments of the method 300 are described below with the combination of the scheduler 130 and the storage system architecture 100 as shown in FIG. 1. It should be understood that the method 300 is not limited to be implemented in the particular example storage system architecture of FIG. 1.

As shown in FIG. 3, the scheduler 130 obtains, at block 310, respective synchronization characteristics of a group of synchronization jobs to be processed. The group of synchronization jobs to be processed, for example, may be the synchronization jobs placed in the waiting queue due to the number of the active jobs reaching the maximum number of the active jobs.

Each of the synchronization characteristics obtained at block 310 indicates at least one of an expected completion time instant of a corresponding job and the amount of data to be synchronized. In some embodiments, for a given synchronization job, the scheduler 130 may obtain the RPO of the synchronization job and the amount of data to be synchronized from an associated replication session. The expected completion time instant of the synchronization job may be determined based on the RPO. The amount of data to be synchronized represents the amount of data that is changed since the last synchronization, and hence hereinafter it may be also referred to as "incremental data size."

The scheduler 130 prioritizes, at block 320, the group of synchronization jobs based on the obtained respective synchronization characteristics (e.g., the expected completion time instant, the amount of data to be synchronized, or both of them) of the group of synchronization jobs. In other words, the scheduler 130 determines respective priorities of the group of synchronization jobs to decide an execution sequence of each of the group of the synchronization jobs.

In some embodiments, at block 320, the scheduler 130 determines, based on the expected completion time instant of the synchronization job, the length of available time for executing the synchronization job until the expected completion time instant, and determines the priority for executing the synchronization job based on the length of the available time.

In a further embodiment, the scheduler 130 may determine, based on both the length of the available time and the amount of data to be synchronized, a priority for executing the corresponding synchronization job.

Both of the length of the available time and the amount of data to be synchronized may be used for predicting a probability of completing execution of the synchronization job before the expected completion time instant. Therefore, the priorities of the synchronization jobs are determined by the length of the available time and/or the amount of data to be synchronized, such that the synchronization jobs having a higher possibility of being executed before the occurrence of failure/disaster can be executed with a higher priority, and thereby increasing the RPO achievement rate.

As a non-limiting example, the priority of the synchronization job may be determined by using a linear combination of the length of the available time and the amount of data to be synchronized of the synchronization job. For example, the scheduler 130 may respectively normalize the length of the available time and the amount of data to be synchronized of the synchronization job and determine the priority of the synchronization job, e.g., a priority weight, based on a weighted sum of the normalized length of the available time and the normalized amount of data to be synchronized.

In some embodiments, a priority $P_i$ of the i-th synchronization job in the group of synchronization jobs to be processed may be determined by the equation (1).

$$P_i = \alpha * \left(1 - \frac{R_{i,t} - R^{min}}{R^{max} - R^{min}}\right) + \beta * \left(1 - \frac{R_{i,d} - D^{min}}{D^{max} - D^{min}}\right), \quad (1)$$

where $R_{i,t}$ represents a remaining length of time of a synchronization job associated with the synchronization session $R_i$, and $R_{i,d}$ represents the amount of data of the synchronization job associated with the synchronization session $R_i$; nonnegative numbers $\alpha$ and $\beta$ are provided for balancing the influence of $R_{i,t}$ and $R_{i,d}$, and $\alpha+\beta=1$. In a storage system with low bandwidth, the priority is determined more effectively by using $R_{i,d}$, and in such a case $\alpha$ and $\beta$ are configured to make $\beta>\alpha$. It should be noted that if a is set to 0 in the equation (1), the scheduler determines the priority of the synchronization job only based on $R_{i,d}$. On the other hand, in a storage system with good bandwidth, the priority is determined more effectively by using $R_{i,t}$, and accordingly $\alpha$ and $\beta$ are configured to make $\alpha>\beta$. In a case that $\beta$ is set to 0, the scheduler determines the priority of the synchronization job only based on $R_{i,t}$.

In addition, $R_{min}$ and $R_{max}$ as well as $D_{min}$ and $D_{max}$ in equation (1) are respectively used for normalizing the remaining length of time $R_{i,t}$ and the amount of data to be synchronized $R_{i,d}$, wherein $R_{min}$ represents the shortest time of RPO of all synchronization jobs, i.e., $R_{min}=\min(R_{i,r})$, where $R_{i,r}$ represents the RPO set for the replication session $R_i$. $R_{max}$ represents the longest time of RPO of all synchronization jobs, i.e., $R_{max}=\max(R_{i,r})$. Dmin represents the smallest incremental data size, i.e., $D_{min}=\min(R_{i,d})$, where $R_{i,d}$ represents the incremental data size between synchronizations of the replication session $R_i$. $D_{max}$ represents the largest incremental data size of all synchronization jobs, i.e., $D_{max}=\max(R_{i,d})$.

It should be noted that the equation (1) only illustrates an example for calculating priority. Embodiments of the present disclosure are not limited to calculating the priorities of synchronization jobs by using this equation. Any other suitable calculating approaches may also be adopted as long as the algorithm takes the length of the available time, the expected completion time instant and/or the amount of data to be synchronized of synchronization jobs into consideration.

Now referring back to and as shown in FIG. 3, the scheduler 130 controls, at block 330, the execution of the group of synchronization jobs based on the result of prioritization determined at block 320. For example, the scheduler 130 may determine, based on the priorities of the group of synchronization jobs, an execution sequence of respective synchronization jobs.

In some embodiments, when the number of current active synchronization jobs is below a threshold (e.g., the maximum number of the active synchronization jobs allowed), the scheduler 130 may select, from the group of synchronization jobs, a synchronization job with the highest priority as a synchronization job to be executed based on the result of prioritization; and execute the selected synchronization job.

The method 300 shown in FIG. 3 may be executed periodically or upon the arrival of a new synchronization job.

In some embodiments, the method 300 may further include block 305, at which the scheduler 130 executes an update operation for the synchronization jobs to be processed. As an example, the operation in block 305 may be similar to the flow in FIG. 2, and includes: in response to arrival of a new synchronization job, the scheduler 130 determines the number of current active synchronization jobs, and in response to the number reaching a threshold (e.g., maximum number of the active synchronization jobs), the scheduler 130 determines to add the new synchronization job into the group of synchronization jobs.

In some embodiments of the present disclosure, for a given synchronization job, the RPO and the incremental data size (i.e., the amount of data to be synchronized) of the synchronization job may be obtained from its replication session. The storage system may use this information to reorder the synchronization jobs, and give a relatively high priority to the synchronization jobs which may be rapidly completed. In this way, the RPO achievement rate before the occurrence of failure/disaster may be improved.

Figure 4:
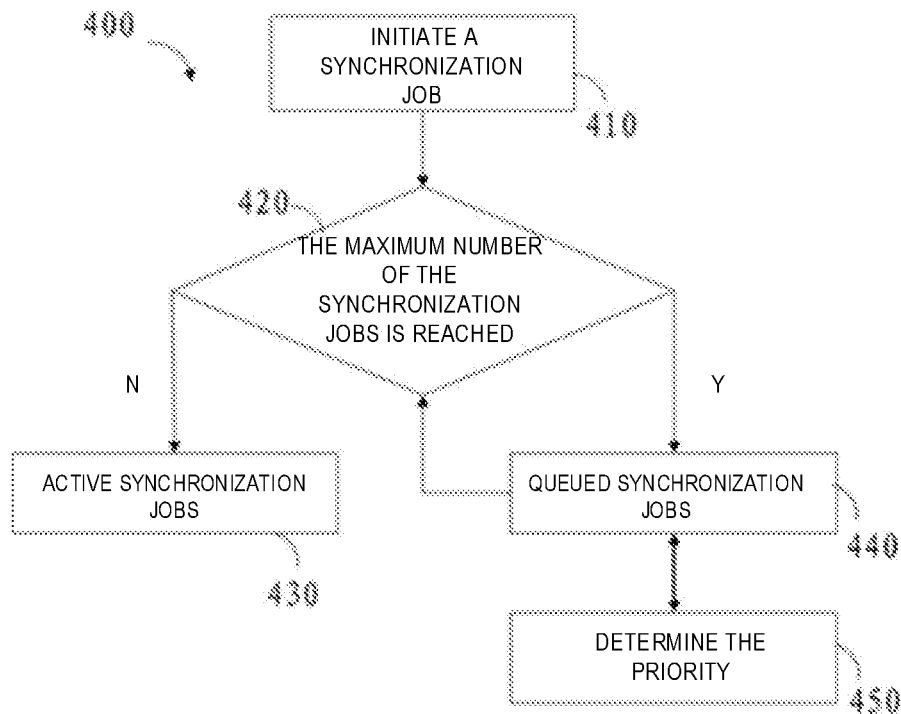
FIG. 4 illustrates a further method for data synchronization according to embodiments of the present disclosure.

FIG. 4 illustrates an example flow of a further method 400 for data synchronization according to embodiments of the present disclosure. The method 400 may be regarded as an example implementation of the method 300 of FIG. 3. The method 400 may be executed, but not limited to, by a scheduler (or a controller) positioned inside or outside the storage system, for example, the scheduler 130 as shown in FIG. 1. The operations of the method 400 are described below by taking the scheduler 130 as an example.

As shown in FIG. 4, the synchronization jobs arrive or are initiated at block 410. The scheduler 130 determines, at block 420, whether the number of the active jobs reaches the maximum number of the active jobs. If the maximum number of the active jobs is not reached, the synchronization jobs arrived are pushed into an active job list for synchronization at block 430. On the contrary, if the maximum number of the active jobs is reached, the synchronization jobs arrived are pushed into a waiting list at block 440. In addition, at block 450, the synchronization jobs in the waiting list are prioritized to determine the execution sequence of the respective synchronization jobs.

In some embodiments, the prioritizing operation in block 450 is executed upon new synchronization jobs comes into the waiting list. In some further embodiments, the prioritizing operation in block 450 may be identical or similar to the operation described with reference to method 300. For example, at block 450, the scheduler 130 may recalculate the remaining time (i.e., the available processing time) of all waiting jobs and determine priorities of the respective waiting jobs according to the remaining time and/or the incremental data size of all jobs.

It should be noted that the performance and network bandwidth of the source storage system and the destination storage system are identical for all synchronization jobs during the same period of time. Therefore, their influences on the algorithm may not be considered when the priority is calculated.

When a certain active job is completed, the number of the active jobs reduces and thus jobs in the waiting list may be pushed into the active list according to the priority determined in block 450.

Synchronization jobs with high priority can be more rapidly completed through the embodiments of the present disclosure (e.g., the method 300 of FIG. 3 or the method 400 of FIG. 4) and the RPO achievement rate can be improved. In addition, the methods of embodiments of the present disclosure are easy to implement, which only change the execution sequence of the synchronization jobs without increasing the data loss rate.

Another advantage of the embodiments of the present disclosure is that only the asynchronous replication synchronization jobs are changed without affecting other services. The methods of the embodiments can be run as background jobs, requires no user participation and thus will not increase the user's burden.

In some embodiments of the present disclosure, each replication session may have two snapshots. When the RPO of the replication session reaches, the source storage system (e.g., the source storage device 110 of FIG. 1) will first refresh one of the snapshots 112 to obtain the latest version of data, and compares it with the snapshot 113 to obtain the incremental data since the last synchronization. Then, the synchronization job is initiated to transmit the incremental data to the destination resources, such as the destination storage device 120.

If the number of the current synchronization jobs does not reach the maximum number of the active jobs, the synchronization jobs associated with the replication session may be added into the active job list and the data transmission begins. If the number of the current synchronization jobs reaches the maximum number of the active jobs, the synchronization jobs are added into the waiting list. In some embodiments, before the synchronization job is added into the waiting list, the scheduler 130 may obtain its RPO and a current time of the storage system, and determine an expected completion time instant of the synchronization job based on the RPO and the current time of the storage system.

When a new synchronization job comes into the waiting list, the scheduler 130 may update the priorities of all waiting synchronization jobs based on the expected completion time instant and the incremental data size. The remaining (i.e., available) time for completing the synchronization job before the expiry of RPO may be obtained by subtracting the current time of the storage system from the expected completion time instant of the synchronization job. Moreover, the scheduler 130 may determine the incremental data size by comparing the two snapshots of the replication session.

In some embodiments, the scheduler 130 may respectively normalize the remaining time and the incremental data size, and determine the priority of each of the waiting synchronization jobs by using the normalized remaining time and the normalized incremental data size as weight values. For example, the scheduler 130 may determine the priority by using the equation (1). The determined priority may be used for reordering all waiting synchronization jobs. In this way, the synchronization jobs with high completion possibility and high urgency in the waiting queue may be given a high priority, so as to increase the RPO achievement rate of the storage system.

Advantages of the data synchronization solution proposed in the present disclosure are illustrated by comparison with the current synchronization algorithm.

Figure 5:
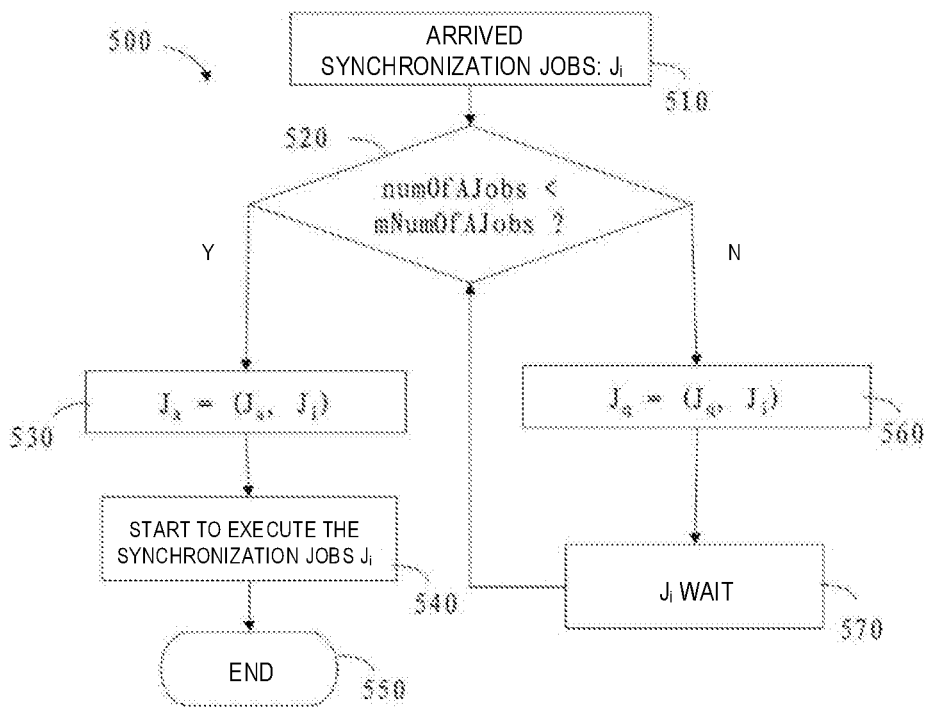
FIG. 5 illustrates a flow of a conventional method in comparison with the solution proposed in the present disclosure.

In the comparison, the following signs and corresponding meanings are used for ease of description:
T: current time
R: replication session
J: all synchronization jobs
$J_a$: active synchronization jobs
$J_q$: queued synchronization jobs
$R_i$: the i-th replication session (also known as the synchronization session), where i=1, 2, . . . , n.
numOfAJobs: the number of the active jobs
mNumOfAJobs: the maximum number of the active jobs, i.e., 0<=numOfAJobs<=mNumOfAJobs
$R_{i,d}$: the incremental data size between synchronization of the replication session $R_i$
$R_{i,r}$: RPO set for the replication session $R_i$
$R_{i,e}$: the expected completion time instant of the synchronization job, which may be determined by adding RPO to the current time T
$R_{min}$: the shortest time of RPO for all synchronization jobs, i.e., $R_{min}=\min(R_{i,r})$
$R_{max}$: the longest time of RPO for all synchronization jobs, i.e., $R_{max}=\max(R_{i,r})$
$D_{min}$: the smallest incremental data size of all synchronization jobs, i.e., $D_{min}=\min(R_{i,d})$
$D_{max}$: the largest incremental data size of all synchronization jobs, i.e., $D_{max}=\max(R_{i,d})$ FIG. 5 illustrates a flow of a conventional method 500 in comparison with the solution proposed in the present disclosure. As shown in FIG. 5, at block 510, the controller creates n asynchronous replication sessions between the source storage and the destination storage, and sets the RPO for each of the replication sessions. A list of the created replication sessions may be denoted as: $R=[R_1, \ldots, R_n]$, and the corresponding synchronization jobs are denoted as $J_i$, i=1, 2, 3, . . . , n.

At block 520, whether the number of the current active synchronization jobs is less than the maximum number of the active synchronization jobs is determined. If it is the case, at block 530, the session $J_i$ is added into the active job list $J_a$, i.e., $J_a=(J_a, J_i)$. The active job list may be denoted as $J_a=[J_{a1}, J_{a2}, \ldots, J_{numOfAJobs}]$. After waiting for an interval time (RPO), the synchronization jobs starts to be executed at block 540 and ends at block 550.

From another aspect, if the number of the current active synchronization jobs is not less than the maximum number of the active synchronization jobs, at block 560, the next synchronization job $J_i$ will be added into the waiting job list $J_q$, i.e., $J_q=(J_q, J_i)$. The waiting job queue may be denoted as $J_q=[J_{q1}, J_{q2}, \ldots, J_{qn}]$. In this case, the synchronization jobs wait at block 570 until the number of the current active synchronization jobs is less than the maximum number of the active synchronization jobs.

Figure 6:
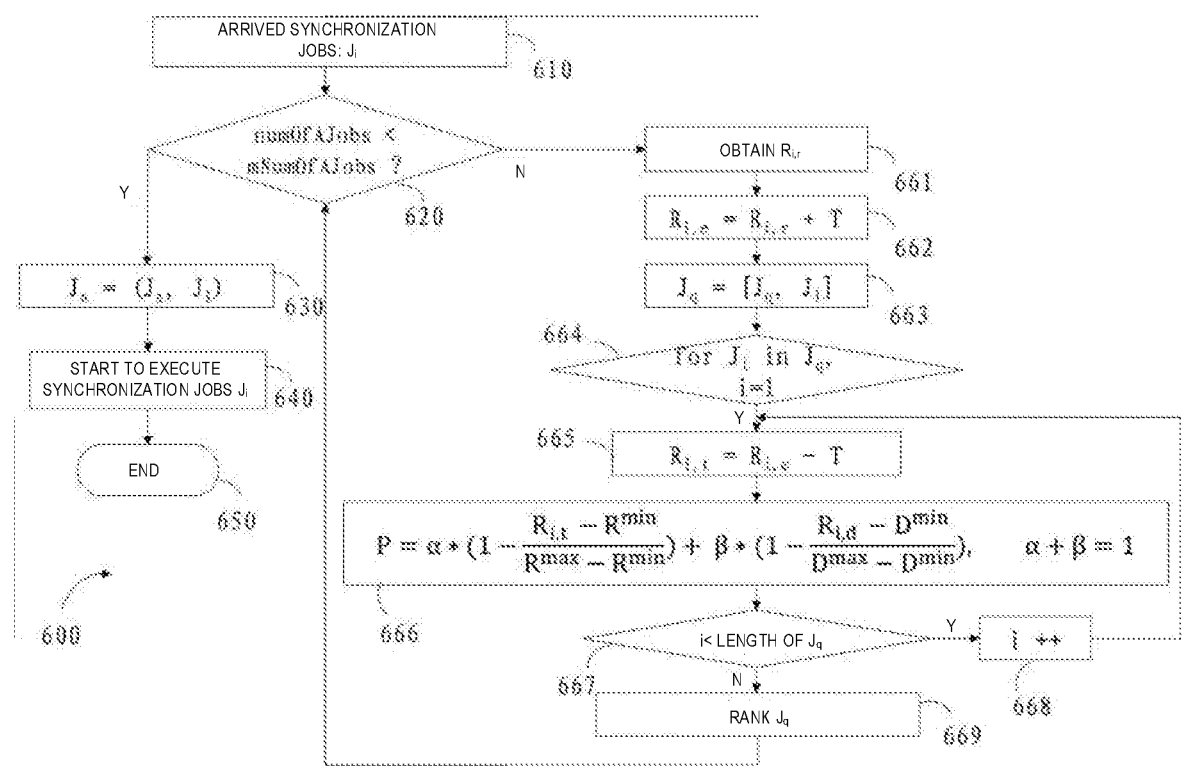
FIG. 6 illustrates a method for data synchronization according to embodiments of the present disclosure.

FIG. 6 illustrates the operations of an example method 600 in comparison with the method of FIG. 5 according to one embodiment of the present disclosure. The method 600 may be considered as an example implementation of the method 300 as shown in FIG. 3.

Operations of blocks 610, 620, 630, 640 and 650 of the method 600 may be identical or similar to those of blocks 510-550 as shown in FIG. 5.

For example, the controller (e.g., the scheduler 130 as shown in FIG. 1) creates, at block 610, n asynchronous replication sessions between the source storage and the destination storage, and sets the RPO for each of the replication sessions. The list of the replication sessions may be denoted as $R=[R_1 \ldots R_n]$ and the corresponding synchronization jobs are denoted as $J_i$, i=1, 2, 3 . . . n.

The scheduler 130 determines, at block 620, whether the number of the current active synchronization jobs is less than the maximum number of the active synchronization jobs. If it is the case, at block 630, the synchronization session $J_i$ will be added into the active job list, i.e., $J_a=(J_a, J_i)$. The active job list may be denoted as $J_a=[J_{a1}, J_{a2}, \ldots, J_i]$, i<=mNumOfAJobs. After waiting for the interval time (RPO), the synchronization jobs starts to be executed at block 640 and ends at block 650.

If the number of the current active synchronization jobs is not less than the maximum number of the active synchronization jobs, the operations of the method 600 is different with those of the method 500. As shown in FIG. 6, when a new synchronization job appears, if the appearance of job $J_i$ will cause the number of the active synchronization jobs to exceed the maximum number of the active jobs, the scheduler 130 obtains, at block 661, the RPO $R_{i,r}$ of the synchronization job (e.g., $R_{i,r}=\text{RPO}(R_{i,r})$) from the replication session $R_i$ associated with the synchronization job. The RPO $R_{i,r}$ is subsequently used for determining the synchronization priority of the synchronization job.

Since the synchronization job is expected to be completed before the next RPO arrives, the expected completion time instant $R_{i,e}$ of the synchronization job may be determined, at block 662, by adding the RPO of the session $R_i$ to the current storage system time as shown in the equation (2).

$$R_{i,e}=R_{i,r}+T \qquad (2)$$

The scheduler 130 may keep the value for the synchronization job for subsequent use for multiple times.

At block 663, the scheduler 130 places the synchronization job $J_i$ into the waiting job list $J_q$, i.e., $J_q=(J_q, J_i)$. The waiting job list may be denoted as $J_q=[J_1 \ldots J_i]$.

At blocks 664-668, the scheduler 130 (re)calculates the priority values of the respective waiting synchronization jobs in the waiting queue $J_q$. For example, the scheduler 130 may execute the operations of block 665 and 666 one by one on the synchronization jobs in the waiting queue $J_q$, as shown in FIG. 6.

At block 665, the scheduler 130 may obtain a value of the expected completion time instant for each job, such as the expected completion time instant $R_{i,e}$ of the replication session $R_i$, i.e., the expected completion time instant of the synchronization job associated with the replication session. The scheduler 130 may calculate the remaining time of the job before the expected completion time instant by subtracting the current time T from the expected completion time instant. In other words, the remaining time for completing the synchronization session $R_i$ may be obtained through the equation (3).

$$R_{i,t} = R_{i,e} - T \qquad (3)$$

Alternatively or additionally, the scheduler 130 may obtain, from the replication session associated with the synchronization job, the incremental data size, e.g., the incremental data size $R_{i,d}$ required to be synchronized for the replication session $R_i$.

At block 666, the scheduler 130 may respectively normalize $R_{i,t}$ and $R_{i,d}$, and use them as the weight values for calculating the priority.

For example, $R_{i,t}$ and $R_{i,d}$ may be respectively normalized as $$\frac{R_{i,t} - R^{min}}{R^{max} - R^{min}} \text{ and } \frac{R_{i,d} - D^{min}}{D^{max} - D^{min}}.$$

The normalized $R_{i,t}$ and $R_{i,d}$, for example, may be used for calculating the priority value through the equation (1).

The above calculations may be executed for each of the synchronization jobs in the waiting queue. The operations of blocks 664, 667 and 668 as shown in FIG. 6 are provided for judging whether priorities have been determined for all synchronization jobs in the waiting queue. When priorities have been determined for all synchronization jobs in the waiting queue, the scheduler 130 ranks, at block 669, the synchronization jobs in the queue according to the priorities.

When a give synchronization job is completed, the scheduler 130 places a certain synchronization job in the waiting queue into the active queue according to the order (or priority), and executes the synchronization job.

In an experiment which compares the method of FIG. 5 with the method of FIG. 6, parameter settings illustrated in Table 1 are used.

TABLE 1

Experiment Parameter Setting

| Parameter | Value |
| --- | --- |
| $R_{min}$ | 0 (min) |
| $R_{max}$ | 1440 (min) |

TABLE 1-continued

Experiment Parameter Setting

| Parameter | Value |
| --- | --- |
| $D_{min}$ | 0 (GB) |
| $D_{max}$ | 262144 (GB) |
| mNumOfAJobs | 5 |
| Bandwidth of storage system | 1000 MB/sec |

Moreover, 10 file systems FS_1 to FS_10 with different RPOs and incremental data sizes as illustrated in Table 2 are used in the experiment. It is assumed that synchronization jobs ($J_1$ (FS_1), ... $J_{10}$ (FS_10)) of all file systems as shown in Table 2 are in the waiting list because the maximum number of the active jobs is exceeded. In addition, the remaining job time in Table 2 is obtained on the assumption that the current time of the storage system is 0:00.

TABLE 2

Synchronization Jobs and Synchronization Characteristics Thereof in the Waiting List

| Synchronization Job | RPO (Min) | Incremental Data Size (GB) | Expected Completion Time | Remaining Time |
| --- | --- | --- | --- | --- |
| $J_1$ (FS_1) | 25 | 150 | 0:20 | 20 |
| $J_2$ (FS_2) | 10 | 210 | 0:05 | 5 |
| $J_3$ (FS_3) | 30 | 55 | 0:25 | 25 |
| $J_4$ (FS_4) | 20 | 102 | 0:15 | 15 |
| $J_5$ (FS_5) | 90 | 10 | 1:25 | 85 |
| $J_6$ (FS_6) | 25 | 278 | 0:20 | 20 |
| $J_7$ (FS_7) | 10 | 25 | 0:05 | 5 |
| $J_8$ (FS_8) | 35 | 2 | 0:30 | 30 |
| $J_9$ (FS_9) | 20 | 89 | 0:15 | 15 |
| $J_{10}$ (FS_10) | 55 | 500 | 0:50 | 50 |

When all of the active jobs in the active queue $J_a$ are completed at T=0:01, five of the synchronization jobs comes from $J_q$ to $J_a$.

According to the method of FIG. 5, the execution results of the jobs in $J_q$ are shown in Table 3.

TABLE 3

Execution Results of Synchronization Jobs in Waiting Queue $J_q$ According to the Method of FIG. 5

| Synchronization Job | Expected Completion Time | Remaining Time (min) | Required Time (min) | Start Time | Actual Completion Time | RPO Achieved? |
| --- | --- | --- | --- | --- | --- | --- |
| $J_1$ (FS_1) | 0:20 | 20 | 13 | 0:01 | 0:14 | Y |
| $J_2$ (FS_2) | 0:05 | 5 | 18 | 0:01 | 0:19 | N |
| $J_3$ (FS_3) | 0:25 | 25 | 5 | 0:01 | 0:06 | Y |
| $J_4$ (FS_4) | 0:15 | 15 | 9 | 0:01 | 0:10 | Y |
| $J_5$ (FS_5) | 1:25 | 85 | 1 | 0:01 | 0:02 | Y |
| $J_6$ (FS_6) | 0:20 | 20 | 24 | 0:02 | 0:26 | N |
| $J_7$ (FS_7) | 0:05 | 5 | 2 | 0:06 | 0:08 | N |
| $J_8$ (FS_8) | 0:30 | 30 | 0 | 0:08 | 0:08 | Y |
| $J_9$ (FS_9) | 0:15 | 15 | 8 | 0:08 | 0:16 | N |
| $J_{10}$ (FS_10) | 0:50 | 50 | 43 | 0:10 | 0:53 | N |

Table 4 illustrates the execution results by using the adaptive control method 600 proposed in the present disclosure. In the example method, the waiting jobs are first ranked according to priority, and the synchronization jobs are executed according to the ranking result.

TABLE 4

Execution Results Obtained by Using the Method 600

| Synchronization Job | Expected Completion Time | Remaining Time (min) | Required Time (min) | Start Time | Actual Completion Time | RPO Achieved? |
|---|---|---|---|---|---|---|
| $J_5$ (FS_5) | 0:30 | 30 | 0 | 0:01 | 0:01 | Y |
| $J_7$ (FS_7) | 0:05 | 5 | 2 | 0:01 | 0:03 | Y |
| $J_8$ (FS_8) | 0:25 | 25 | 5 | 0:01 | 0:06 | Y |
| $J_{10}$ (FS_10) | 1:25 | 85 | 1 | 0:01 | 0:02 | Y |
| $J_3$ (FS_3) | 0:15 | 15 | 8 | 0:01 | 0:09 | Y |
| $J_1$ (FS_1) | 0:15 | 15 | 9 | 0:01 | 0:10 | Y |
| $J_9$ (FS_9) | 0:20 | 20 | 13 | 0:02 | 0:15 | Y |
| $J_4$ (FS_4) | 0:05 | 5 | 18 | 0:03 | 0:21 | N |
| $J_6$ (FS_6) | 0:20 | 20 | 24 | 0:06 | 0:30 | N |
| $J_2$ (FS_2) | 0:50 | 50 | 43 | 0:09 | 0:52 | N |

In the above experiment, 10 file systems with different RPOs and incremental data sizes are selected randomly. Two results (Table 3 and Table 4) obtained from the simulation experiment demonstrate that the use of the adaptive synchronization method proposed in the embodiments of the present disclosure improves the RPO achievement rate and consumes less time to initiate and complete the synchronization jobs. A comparison result of the RPO achievement situations between the two methods is illustrated in the Table 5 below. It can be observed from the result that the RPO achievement rate is significantly improved by using the method of the embodiments of the present disclosure.

TABLE 5

Comparison Result of RPO Achievement Situations

| Method | Total Number of Jobs | The Number of Achieved RPOs | RPO Achievement Rate |
|---|---|---|---|
| Without the Adaptive Method of the Present Disclosure | 10 | 5 | 50.00% |
| With the Adaptive Method of the Present Disclosure | 10 | 7 | 70.00% |

Figure 7:
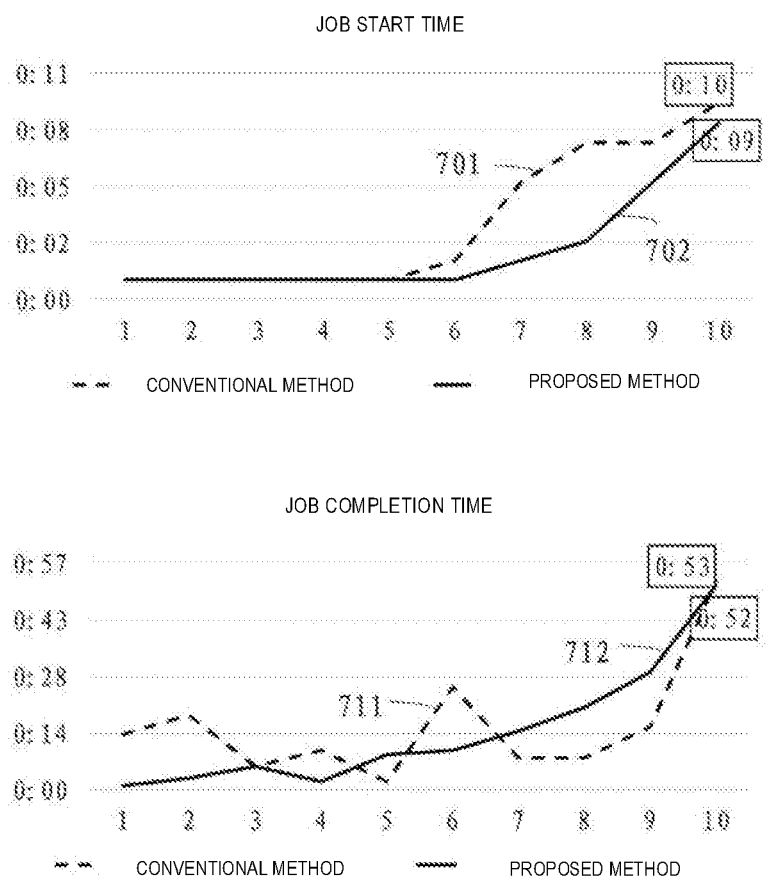
FIG. 7 illustrates a comparison result of start time and completion time of the synchronization jobs.

FIG. 7 illustrates a comparison result of start time and completion time of the synchronization jobs, in which dashed lines 701 and 711 respectively indicate job start time and job completion time obtained according to the conventional method 500, and solid lines 702 and 712 respectively indicate job start time and job completion time obtained according to the method 600 proposed by the present disclosure. The result shows that the synchronization jobs with high priority can be completed faster by using the method of the embodiments of the present disclosure. Compared with the current implementation, less time is consumed for initiating and completing the synchronization jobs.

Figure 8:
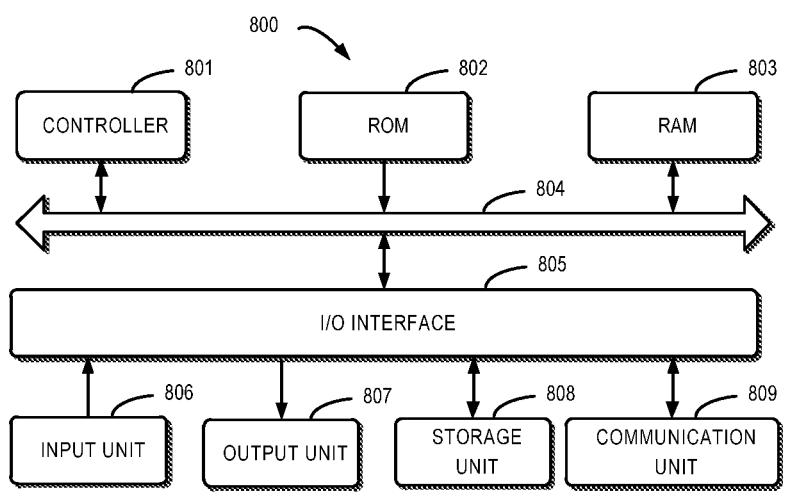
FIG. 8 illustrates an example structure diagram of an electronic device according to embodiments of the present disclosure.

FIG. 8 illustrates a schematic block diagram of an electronic device 800 that may be used to implement the embodiments of the present disclosure. As shown in FIG. 8, the electronic device 800 includes a controller 801 which may also be known as a processing unit (e.g., CPU), and may execute various suitable acts and processing based on the programs stored in the read-only memory (ROM) 802 and/or the random-access memory (RAM) 803. The ROM 802 and/or RAM 803 may store various programs and data required for the operations of the device 800. The controller 801, the ROM 802 and the RAM 803 are connected with each other via a bus 804. In particular, the electronic device 800 also includes one or more dedicated processing units (not shown), which may also be connected to the bus 804.

An input/output (I/O) interface 805 is also connected to the bus 804. A plurality of components in the electronic device 800 is connected to the I/O interface 805, which includes: an input unit 806, such as a keyboard, a mouse and the like; an output unit 807, e.g., various kinds of displays and loudspeakers etc.; a storage unit 808, such as a magnetic disk, an optical disk etc.; and a communication unit 809, such as a network card, a modem, a wireless transceiver etc. The communication unit 809 allows the electronic device 800 to exchange information/data with other devices through a computer network, such as the Internet, and/or various kinds of telecommunication networks.

In some of the embodiments, the controller 801 may be configured to execute each procedure and processing as described above, such as functions of the method 300, 400 or 600. For example, in some embodiments, respective modules of the method 300, 400 or 600 may be implemented as a computer software programs that are tangibly included in a machine-readable medium, e.g., the storage unit 808. In some embodiments, part or all of the computer programs may be loaded and/or installed onto the electronic device 800 via the ROM 802 and/or the communication unit 809. When the computer program is loaded to RAM 803 and executed by the controller 801, one or more operations of the method 300, 400 or 600 as described above may be implemented. Alternatively, in other embodiments, the controller 801 may be configured in any other suitable manners to implement the processing/methods as described above.

In particular, according to the embodiments of the present disclosure, the methods and device as described above with reference to FIGS. 2-8 may be implemented as computer program products, which are tangibly stored on a non-transient computer-readable storage medium and include machine-executable instructions. The instructions, when executed, may cause the machine to fulfill each of the aspects according to the present disclosure.

The computer-readable storage medium may be a tangible apparatus that may store instructions for use by an instruction executing device. The computer-readable storage medium may include, but not limited to, an electrical storage device, a magnetic storage device, an optical storage device, an electromagnetic storage device, a semiconductor storage device or any appropriate combinations of the above. More concrete and non-exhaustive examples of the computer-readable storage medium include the following: a portable computer disk, a hard disk, a random-access memory (RAM), a read-only memory (ROM), an erasable programmable read-only memory (EPROM or flash), a static random-access memory (SRAM), a portable compact disk read-only memory (CD-ROM), a digital disk (DVD), memory stick, a floppy disk, a mechanically encoded device, such as punch-card or raised structures in a groove having instructions recorded thereon, and any appropriate combination of the above.

The computer program instructions for executing the operations of the present disclosure may be assembly instructions, instruction set architecture (ISA) instructions, machine instructions, machine-related instructions, microcode, firmware instructions, state-setting data, or source code or object code written in any combination of one or more programming languages, including an object-oriented programming languages, such as Java, Smalltalk, C++ and so on, and conventional procedural programming languages, such as "C" language or similar programming languages. The computer-readable program instructions may be entirely executed on the user's computer, partially on the user's computer, as a stand-alone software package, partially on the user's computer and partially on a remote computer, or entirely on the remote computer or server. In the case where the remote computer is involved, the remote computer may be connected to the user's computer through any type of networks, including a local area network (LAN) and a wide area network (WAN), or the connection may be made to an external computer, for example through the Internet using an Internet service provider. In some embodiments, state information of the computer-readable program instructions may be used to customize an electronic circuit, e.g., programmable logic circuit, field programmable gate array (FPGA) or programmable logic array (PLA), and the electronic circuit may execute the computer-readable program instructions to implement various aspects of the present disclosure.

Various aspects of the present disclosure are described herein with reference to block diagrams and/or flow charts of device, methods and computer program products according to embodiments of the present disclosure. It should be understood that each block of the block diagrams and/or flow charts, and combinations of various blocks in the block diagrams and/or flow charts may be implemented by computer-readable program instructions Various embodiments of the present disclosure have been described for the purpose of exam, but are not intended to be limited to the disclosed embodiments. Without departing from the essence of the present disclosure, all modifications and variations fall within the protection scope of the present disclosure and/or as defined by the claims.

We claim:

1. A method for data synchronization within a storage system having a scheduler, a first storage device, and a second storage device, comprising:
    obtaining sets of respective synchronization characteristics of a plurality of synchronization jobs of a group of synchronization jobs to be executed, each set of synchronization characteristics indicating an expected-completion time instant and an amount of data to be synchronized of a corresponding synchronization job in a plurality of synchronization sessions;
    prioritizing the group of the synchronization jobs to provide a ranking, the ranking indicating an order in which to execute the synchronization jobs of the group of synchronization jobs; and
    executing the group of the synchronization jobs in the plurality of synchronization sessions according to the ranking beginning with a highest priority synchronization job and ending with a lowest priority synchronization job, the group of synchronization jobs synchronizing data between the first storage device and the second storage device during the plurality of synchronization sessions;
    wherein prioritizing the group of the synchronization jobs includes:
        normalizing lengths of available time for executing the synchronization jobs and amounts of data to be synchronized of the synchronization jobs, each of the lengths of available time for executing the synchronization jobs indicating an amount of time until a respective expected completion time instant from a current time instant of the storage system; and
        determining the ranking based on weighted sums of the normalized lengths of available times and the normalized amounts of data to be synchronized; and
    wherein the scheduler is constructed and arranged to
        direct new synchronization jobs at the storage system to an execution path of the storage system while the number of current active synchronization jobs in the synchronization group is below a predetermined threshold,
        queue the new synchronization jobs within a waiting queue of the storage system while the number of current active synchronization jobs in the synchronization group is not below the predetermined threshold, and
        reorder the synchronization jobs residing within the waiting queue.

2. The method according to claim 1, wherein obtaining the synchronization characteristics comprises:
    obtaining respective Recovery Point Objectives RPOs of the group of synchronization jobs and the current time instant of the storage system; and
    determining the expected completion time instant of the corresponding synchronization job based on the RPO of the corresponding synchronization job and the current time instant of the storage system.

3. The method according to claim 1, further comprising:
    in response to arrival of each new synchronization job at the storage system, determining the number of current active synchronization jobs in the group of synchronization jobs; and
    in response to the number reaching a threshold, adding the new synchronization job into the group of synchronization jobs.

4. The method according to claim 1, wherein executing the group of the synchronization jobs includes:
    in response to the number of the current active synchronization jobs being below the predetermined threshold, selecting from the group of synchronization jobs a synchronization job with the highest priority as a synchronization job to be executed based on the result of the prioritizing; and
    executing the selected synchronization job.

5. The method according to claim 1, wherein each weighted sum of the set of weighted sums is based on a length of available time for executing and an amount of data to be synchronized for a respective synchronization job of the group of synchronization jobs.

6. The method according to claim 1, wherein the storage system is tasked with performing data replication between the first storage device and the second storage device in accordance with a predefined Recovery Point Objective (RPO) requirement; and
   wherein the group of synchronization jobs to be executed are synchronization jobs awaiting execution to replicate data from the first storage device to the second storage device during the plurality of synchronization sessions.

7. The method according to claim 1, wherein obtaining the respective synchronization characteristics includes calculating, as an expected completion time instant of a particular synchronization job, a latest time before an expiry of a Recovery Point Objective (RPO) associated with the particular synchronization job; and
   wherein the method further comprises calculating, as a length of available time for executing the particular synchronization job and after obtaining the respective synchronization characteristics, a difference between the expected completion time instant of the particular synchronization job and the current time instant.

8. The method according to claim 1, further comprising:
   after prioritizing the group of the synchronization jobs, updating the group of the synchronization jobs to include another synchronization job; and
   in response to updating the group of synchronization jobs, updating the lengths of available times for executing the synchronization jobs and reprioritizing the group of the synchronization jobs based on the updated lengths of available times.

9. An electronic device, comprising:
   at least one processor;
   a scheduler; and
   at least one memory coupled to the at least one processor and having computer programs stored therein, the computer programs, when executed by the at least one processor, causing the electronic device to:
      obtain sets of respective synchronization characteristics of a plurality of synchronization jobs of a group of synchronization jobs to be executed, each set of synchronization characteristics indicating an expected completion time instant and an amount of data to be synchronized of a corresponding synchronization job in a plurality of synchronization sessions;
      prioritize the group of the synchronization jobs to provide a ranking, the ranking indicating an order in which to execute the synchronization jobs of the group of synchronization jobs; and
      execute the group of the synchronization jobs in the plurality of synchronization sessions according to the ranking beginning with a highest priority synchronization job and ending with a lowest priority synchronization job, the group of synchronization jobs synchronizing data between a first storage device and a second storage device during the plurality of synchronization sessions;
   wherein the electronic device, when prioritizing the group of the synchronization jobs, is constructed and arranged to:
      normalize lengths of available time for executing the synchronization jobs and amounts of data to be synchronized of the synchronization jobs, each of the lengths of available time for executing the synchronization jobs indicating an amount of time until a respective expected completion time instant from a current time instant of the electronic device; and
      determine the ranking based on weighted sums of the normalized lengths of available times and the normalized amounts of data to be synchronized; and
   wherein the scheduler is constructed and arranged to
      direct new synchronization jobs at the electronic device to an execution path of the electronic device while the number of current active synchronization jobs in the synchronization group is below a predetermined threshold,
      queue the new synchronization jobs within a waiting queue of the electronic device while the number of current active synchronization jobs in the synchronization group is not below the predetermined threshold, and
      reorder the synchronization jobs residing within the waiting queue.

10. The electronic device according to claim 9, wherein obtaining the synchronization characteristics comprises:
    obtaining respective Recovery Point Objectives RPOs of the group of synchronization jobs and the current time instant of the electronic device; and
    determining the expected completion time instant of the corresponding synchronization job based on the RPO of the corresponding synchronization job and the current time instant of the electronic device.

11. The electronic device according to claim 9, wherein the computer programs, when executed by the at least one processor, further cause the electronic device to:
    in response to arrival of each new synchronization job at the electronic device, determine the number of current active synchronization jobs in the group of synchronization jobs; and
    in response to the number reaching a threshold, add the new synchronization job into the group of synchronization jobs.

12. The electronic device according to claim 9, wherein executing the group of the synchronization jobs includes:
    in response to the number of the current active synchronization jobs being below the predetermined threshold, selecting from the group of synchronization jobs a synchronization job with the highest priority as a synchronization job to be executed based on the result of the prioritizing; and
    executing the selected synchronization job.

13. The electronic device according to claim 9, wherein the electronic device is tasked with performing data replication between the first storage device and the second storage device in accordance with a predefined Recovery Point Objective (RPO) requirement; and
    wherein the group of synchronization jobs to be executed are synchronization jobs awaiting execution to replicate data from the first storage device to the second storage device during the plurality of synchronization sessions.

14. The electronic device according to claim 9, wherein obtaining the respective synchronization characteristics includes calculating, as an expected completion time instant of a particular synchronization job, a latest time before an expiry of a Recovery Point Objective (RPO) associated with the particular synchronization job; and
    wherein the computer programs, when executed by the at least one processor further cause the electronic device to: calculate, as a length of available time for executing the particular synchronization job and after obtaining the respective synchronization characteristics, a difference between the expected completion time instant of the particular synchronization job and the current time instant.

15. A computer program product having a non-transitory computer readable medium which stores a set of instructions to perform data synchronization; the set of instructions, when carried out by computerized circuitry, causing the computerized circuitry to perform a method of:
obtaining sets of respective synchronization characteristics of a plurality of synchronization jobs of a group of synchronization jobs to be executed, each set of synchronization characteristics indicating an expected completion time instant and an amount of data to be synchronized of a corresponding synchronization job in a plurality of synchronization sessions;
prioritizing the group of the synchronization jobs to provide a ranking, the ranking indicating an order in which to execute the synchronization jobs of the group of synchronization jobs; and
executing the group of the synchronization jobs in the plurality of synchronization sessions according to the ranking beginning with a highest priority synchronization job and ending with a lowest priority synchronization job, the group of synchronization jobs synchronizing data between a first storage device and a second storage device during the plurality of synchronization sessions;
wherein prioritizing the group of the synchronization jobs includes:
normalizing lengths of available time for executing the synchronization jobs and amounts of data to be synchronized of the synchronization jobs, each of the lengths of available time for executing the synchronization jobs indicating an amount of time until a respective expected completion time instant from a current time instant of the circuitry; and
determining the ranking based on weighted sums of the normalized lengths of available times and the normalized amounts of data to be synchronized; and
wherein a scheduler contained in the circuitry is constructed and arranged to
direct new synchronization jobs at the circuitry to an execution path of the circuitry while the number of current active synchronization jobs in the synchronization group is below a predetermined threshold,
queue the new synchronization jobs within a waiting queue of the circuitry while the number of current active synchronization jobs in the synchronization group is not below the predetermined threshold, and
reorder the synchronization jobs residing within the waiting queue.

16. The computer program product according to claim 15, wherein the circuitry is tasked with performing data replication between the first storage device and the second storage device in accordance with a predefined Recovery Point Objective (RPO) requirement; and
wherein the group of synchronization jobs to be executed are synchronization jobs awaiting execution to replicate data from the first storage device to the second storage device during the plurality of synchronization sessions.

17. The computer program product according to claim 15, wherein obtaining the synchronization characteristics comprises:
obtaining respective Recovery Point Objectives RPOs of the group of synchronization jobs and the current time instant of the circuitry; and
determining the expected completion time instant of the corresponding synchronization job based on the RPO of the corresponding synchronization job and the current time instant of the circuitry.

18. The computer program product according to claim 15, wherein the set of instructions, when carried out by the computerized circuitry, further cause the computerized circuitry to perform:
in response to arrival of each new synchronization job at the circuitry, determine the number of current active synchronization jobs in the group of synchronization jobs in the group of synchronization jobs; and
in response to the number reaching a threshold, add the new synchronization job into the group of synchronization jobs.

19. The computer program product according to claim 15, wherein the set of instructions, when carried out by the computerized circuitry, further cause the computerized circuitry to perform:
in response to the number of the current active synchronization jobs being below the predetermined threshold, selecting from the group of synchronization jobs a synchronization job with the highest priority as a synchronization job to be executed based on the result of the prioritizing; and
executing the selected synchronization job.

20. The computer program product according to claim 15, wherein obtaining the respective synchronization characteristics includes calculating, as an expected completion time instant of a particular synchronization job, a latest time before an expiry of a Recovery Point Objective (RPO) associated with the particular synchronization job; and
wherein the set of instructions, when carried out by the computerized circuitry, further cause the computerized circuitry to perform: calculating, as a length of available time for executing the particular synchronization job and after obtaining the respective synchronization characteristics, a difference between the expected completion time instant of the particular synchronization job and the current time instant.

* * * * *